Dec. 5, 1961  C. C. HOSBACH  3,011,270
EDUCATIONAL TOY FOR TEACHING ARITHMETIC
Filed April 4, 1960

INVENTOR.
Carl C. Hosbach
BY
Wilson, Lewis & McRae
ATTORNEYS

United States Patent Office 3,011,270
Patented Dec. 5, 1961

3,011,270
EDUCATIONAL TOY FOR TEACHING ARITHMETIC
Carl C. Hosbach, 29617 Fort St., Rockwood, Mich.
Filed Apr. 4, 1960, Ser. No. 19,894
4 Claims. (Cl. 35—31)

This invention relates to educational toys.

One of the objects of the invention is to provide an attractive and amusing toy suitable for very young children, such as pre-school children.

Another object of the invention is to provide an educational toy which will help teach such children to count.

Still another object is to provide an educational toy which will teach young children to recognize the symbols, both word and numerical, which represent each number counted. More specifically, it is an object to provide a series of representations of objects so that any number of the objects in the series may be displayed to be counted, and simultaneously to display the number or numerical symbol representing the number of objects which are displayed, and also preferably to display the word representing that number, so that the child will associate the visual representation of the appropriate symbol with observation of the actual number of objects represented by each symbol.

Other objects of this invention will appear in the following description and appended claims, reference being had to the accompanying drawings forming a part of this specification, wherein each particular reference character always designates the same part throughout the several views.

Figures 1, 2, 3:
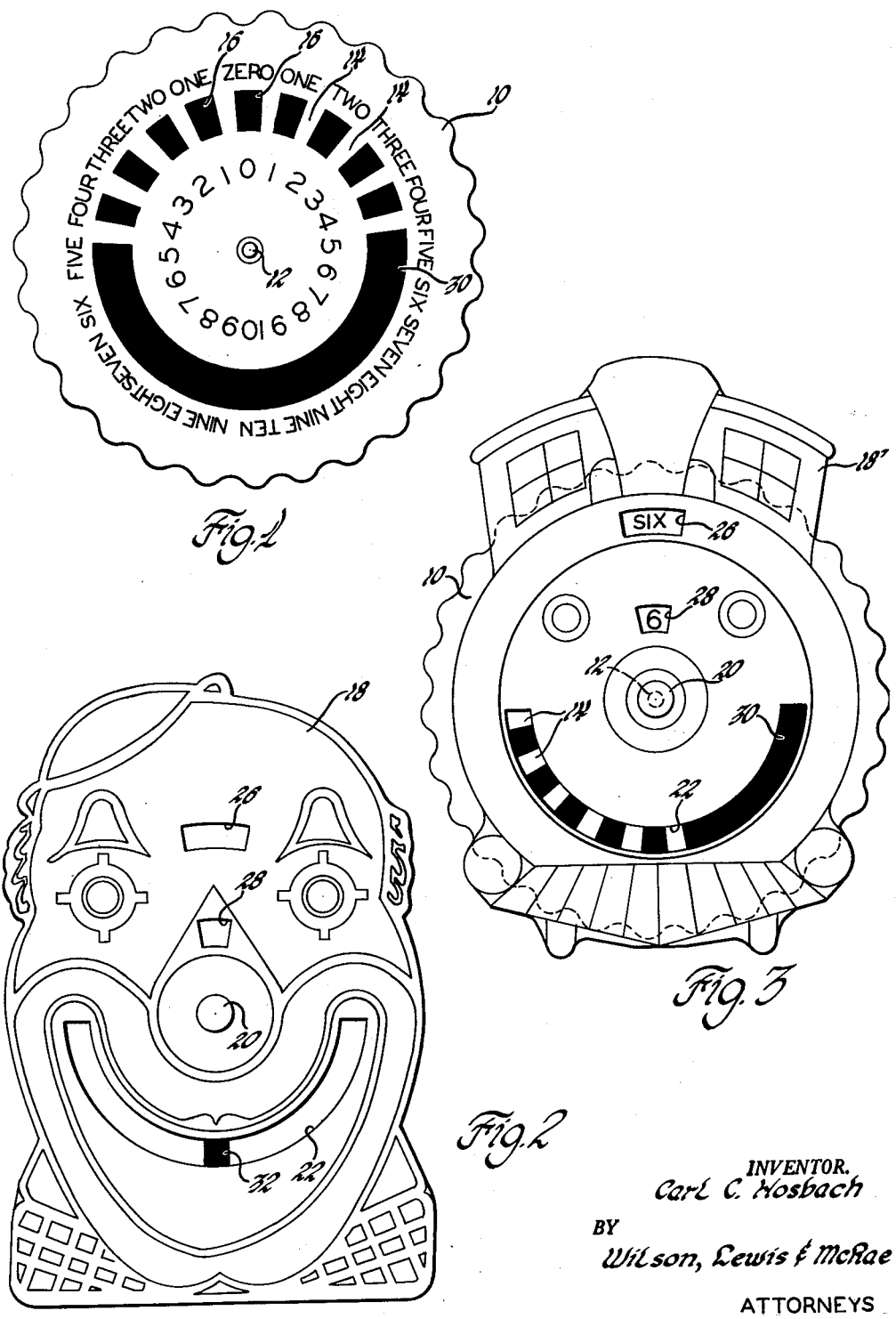
FIG. 1 is a plan of a base forming a portion of the toy.
FIG. 2 is a plan of a mask or cover for the base.
FIG. 3 is a plan of a complete assembled toy having a mask of a different form and showing portions of the base visible through the mask to reveal a number of representations of objects and the corresponding word and number symbols for this number of objects.

Before explaining the invention in detail it is to be understood that the invention is not limited in application to the details of construction and arrangement of parts illustrated in the accompanying drawings, since the invention is capable of other embodiments and of being practiced or carried out in various ways. Also it is to be understood that the phraseology or terminology employed herein is for the purpose of illustration and description and not of limitation.

Referring to the drawings the base 10 is of generally circular form and preferably has a serrated or notched edge by which it can be readily rotated with respect to the mask. At its center, one half or one member 12 of any suitable separable pivot, such as a snap fastener, is secured to the base. The base may be made of any suitable stiff material such as cardboard, heavy paper, plastic or the like. A series of representations of things to be counted 14 is arranged in a circular arc whose center is the snap fastener member 12. These may be, for example, light areas or spaces separated by dark areas or spaces 16. A series of words designating numbers, such as from one to ten is arranged in a second arc (which may be a complete circle) whose center is also the snap fastener member 12. The words are located at angular positions along this arc corresponding to the angular positions of the representations of adjacent objects 14 about the pivot 12. A series of number symols such as the Arabic numbers from one to ten is arranged in a third arc or circle preferably inside the other arcs and also concentric with them. The numerical symbols are placed along their arc at angular distances corresponding to the positions of the objects 14 and the number words.

A cover or mask 18 is preferably formed with the representation of a figure, which may be either natural or a personalized figure of an inanimate object. This is formed of any suitable material and may be similar to the material of the base. A complementing snap fastener portion or half 20, secured to the mask or cover at its central portion, may be snapped on the mating fastener 12, so that the cover or mask may be attached to the base and pivoted on the base. When the toy is thus assembled, the serrated edge of the base 10 projects beyond appropriate portions of the mask and appropriate portions of the mask such as the top and bottom project beyond the base. This is to allow the mask to be held in one hand and the base turned readily with reference to the mask.

The mask is preferably formed of opaque material. A representation of a mouth 22 which may be either a slot cut out of the mask or a transparent window is formed as an arc having the same mean radius and center as the mean radius and center of the arc of the representation of the objects 14. Thus when the mask is assembled on the base by assembling the two halves of the snap fastener the white spaces 14 between the dark separating spaces 16 as visible through the open spit of the mouth look like teeth.

A transparent or cut out window 26 is formed in any suitable part of the mask at a distance from the snap fastener corresponding to the arc of the word symbols and a similar transparent or cut out window is formed at a distance from the center corresponding to the arc of the number symbols. The teeth, the number symbols, the word symbols and the windows are all so formed and placed that whenever a number of complete teeth 14 are visible in the mouth, the window 26 reveals, and reveals only the word symbol corresponding to the number of teeth visible, and the window 28 reveals, and reveals only the numerical symbol corresponding to the number of teeth visible. For example, as shown in FIG. 3 there is a mask 18' and there are six teeth visible in the mouth, the window 28 shows the Arabic number 6 and the window 26 shows the word six.

If desired, a long, dark separating or blanking out space 30 may be arranged on the arc of the objects 14 so that the base can be rotated to show no teeth in the mouth in which case the window 28 will show the zero figure and the window 26 will show the word zero or none.

The inherent shape of the mouth on the mask forms an upper lip which is likely, by abuse, to be bent out of the plane of the mask and reveal numerical symbols not visible through the window 28 and consequently incorrect. To avoid this possibility the mouth may, if desired, be bridged at the center by a bridge 32 which holds the two lips together. This bridge is preferably the color of the spaces between the teeth and arranged in such position that when any number of complete teeth is visible in the mouth the bridge is opposite the space between the teeth and does not alter the appearance of the assembly, nor interfere with the count.

Having thus described my invention, I claim:

1. An educational toy or the like comprising in combination a generally flat circular base having an edge and having alternating light and dark areas arranged in a circular arc on the base, a series of word symbols of numbers on the base arranged in numerical order in a circular arc concentric with the first-mentioned arc but having a larger mean radius, a series of number symbols on the base arranged in the same numerical order in an arc concentric with the first arc but having a smaller mean radius than the first arc, the base having means forming part of a separable pivot at the center of said arcs, and an opaque mask having means forming a portion of a pivot complementary to the first-mentioned part of the pivot and engaged therewith to secure the mask and base together for relative rotation, the edge of the base projecting beyond one portion of the mask, and another portion of the mask projecting beyond the edge of the base, the mask bearing a representation of a figure having a transparent mouth, the mouth being a circular arc concentric with the pivot and having approximately the same mean radius as that of the first-mentioned arc on the base, said mouth cooperating with said light and dark areas on the base to define representations of teeth, and a bridge across the mouth having an arcuate length not greater than the arcuate length of spaces between the teeth, a window in the mask at a distance from the pivot corresponding to the second-mentioned arc, another window in the mask at a distance from the pivot corresponding to the third-mentioned arc, said symbols and representations of teeth and said mouth and windows all being so arranged that in all relative positions of the base and mask the number of teeth visible through the mouth is the same as the number represented by both the number symbols and word symbols visible through said windows.

2. An educational toy or the like comrpising in combination a flat base having an edge and having alternating light and dark areas arranged in a circular arc on the base, a series of word symbols of numbers on the base arranged in numerical order in a circular arc concentric with the first-mentioned arc but having a different mean radius, a series of number symbols on the base arranged in the same numerical order in an arc concentric with the first arc but having a mean radius different from the radii of the other arcs, the base having means forming part of a separable pivot at the center of said arcs, and an opaque mask having means forming a portion of a pivot complementary to the first-mentioned portion of the pivot and engaged therewith to secure the mask and base together for relative rotation, the edge of the base projecting beyond one portion of the mask and another portion of the mask projecting beyond the base, the mask bearing a representation of a figure having a transparent mouth, the mouth being a circular arc concentric with the pivot and having approximately the same mean radius as that of the first-mentioned arc on the base, said mouth cooperating with said light and dark areas on the base to define representations of teeth, a first window in the mask at a distance from the pivot corresponding to the second-mentioned arc, a second window in the mask at a distance from the pivot corresponding to the third-mentioned arc, said symbols and representations of teeth and said mouth and windows being so arranged that in all relative positions of the base and mask the number of teeth visible through the mouth is the same as the number represented by both the number symbols and word symbols visible through said windows.

3. An educational toy or the like comprising in combination a generally circular base having an edge and having spaced representations of objects to be counted arranged in a circular arc, a series of word symbols of numbers arranged in numerical order in a second circular arc concentric with the first-mentioned arc but having a different mean radius, a series of number symbols arranged in the same numerical order in a third arc concentric with the first arc but having a mean radius different from the radii of the first and second arcs, fastening means associated with the base at the center of said arcs, and an opaque mask having complementary fastening means secured to its central portion and engaged with the aforementioned fastening means to secure the mask and base together for relative rotation, the edge of the base projecting beyond one portion of the mask and another portion of the mask projecting radially beyond the base, the mask having a first transparent window formed as a circular arc and having approximately the same mean radius as that of the first-mentioned arc on the base, a second transparent window in the mask and having approximately the same mean radius as that of the second-mentioned arc, a third transparent window in the mask having approximately the same radius as the third-mentioned arc, said symbols and representations and said windows being so arranged that in all relative positions of the base and mask the number of representations visible through the first window is the same as the number represented by both the number symbols and word symbols visible through said second and third windows.

4. An educational toy comprising a flat base having an edge and having alternating light and dark areas arranged in a circular arc on the base, a series of word symbols on the base arranged in numerical order in a circular arc concentric with the first-mentioned arc but having a different mean radius, a series of number symbols on the base arranged in the same numerical order in an arc concentric with the first arc but having a different means radius than the first arc, the base having means forming part of a pivot at the center of said arcs, and an opaque mask having means forming a portion of a pivot adapted to align with the first-mentioned pivot whereby the mask and base may be secured together for relative rotation, the edge of the base projecting beyond one portion of the mask, the mask bearing a representation of a figure having an open mouth, the mouth being of a circular arc configuration concentric with the pivot and having approximately the same mean radius as that of the first-mentioned arc on the base, said mouth cooperating with said light and dark areas on the base to define a representation of articles, an aperture in the mask at a distance from the pivot corresponding to the second-mentioned arc, another aperture in the mask at a distance from the pivot corresponding to the third-mentioned arc, said symbols and representations of teeth and said mouth and apertures all being so arranged that in all relative positions of the base and mask the number of articles visible through the mouth is the same as the number represented by both the number symbols and word symbols visible through said apertures.

References Cited in the file of this patent

UNITED STATES PATENTS

| | | |
|---|---|---|
| 1,438,144 | Stevenson | Dec. 5, 1922 |
| 2,188,723 | Posey | Jan. 30, 1940 |

FOREIGN PATENTS

| | | |
|---|---|---|
| 363,392 | Germany | Nov. 7, 1922 |
| 690,554 | Great Britain | Jan. 11, 1951 |